United States Patent [19]

Meyer et al.

[11] Patent Number: 4,786,339
[45] Date of Patent: Nov. 22, 1988

[54] JACKETING STEEL OBJECTS

[75] Inventors: Walter Meyer, Duisburg; Walter Stucke, Ratingen, both of Fed. Rep. of Germany

[73] Assignee: Mannesmann AG, Duesseldorf, Fed. Rep. of Germany

[21] Appl. No.: 122,272

[22] Filed: Nov. 18, 1987

[30] Foreign Application Priority Data

Nov. 18, 1986 [DE] Fed. Rep. of Germany ....... 3639417

[51] Int. Cl.⁴ .......................... B05D 1/36; C23C 22/24
[52] U.S. Cl. ..................................... 148/6.2; 138/146; 138/143
[58] Field of Search ....................... 138/145, 146, 143; 148/6.2

[56] References Cited

U.S. PATENT DOCUMENTS 4,548,868 10/1985 Yinezawa ............................ 428/446

FOREIGN PATENT DOCUMENTS 0077324 6/1978 Japan .................................... 138/146
0029661 2/1983 Japan .................................... 138/146

Primary Examiner—Sam Silverberg
Attorney, Agent, or Firm—Ralf H. Siegemund

[57] ABSTRACT

In a method for continuously jacketing steel objects particularly tubing including the steps of cleaning the object by means of blasting its surface; chromatizing the cleaned surface by exposing the surface to a silicate containing watery solution of 3 and/or 6 valued chromium compound or compounds, drying the object at a temperature preferably between 105 degrees C. and 130 degrees C. which is well below the temperature necessary either for an application of a bonding and cover layer and/or for curing of the epoxy resin; a blend being applied prior to conversion of the chromatizing medium and any chromium iron compounds into a thermally stable intermediate layer including a chromium iron silicate oxide layer, the application of epoxy resin curing agent is carried out in two steps to obtain at least two sublayers, the first one of the layer being more reactive than the second one at temperature below 170 degrees C. and the two sublayers are cured together thereafter at a temperature between 170 to 240 degrees C., the first sublayer is applied in the liquidous state and the second layer is applied as a powder.

8 Claims, 1 Drawing Sheet

JACKETING STEEL OBJECTS

BACKGROUND OF THE INVENTION

The present invention relates to the jacketing of objects made of steel, particularly pipes, tubing or the like under utilization of synthetic material for the purpose of jacketing.

Numerous methods are known to provide metal objects particularly steel pipes with a protection against corrosion. This is particularly true in those cases in which subterranean installation of such tubing or other metal objects is envisioned and here a thermoplastic cover made of polyethylene, polyvinylchloride or polypropylene has been found highly suitable. The particular jacket is bonded adhesively to the steel pipe which is the usual method for attachment. For covering the tubing with a synthetic material one can however use a seamless hose which for example is extruded by means of an annular nozzle onto and around the tube, i.e. the tube to be jacketed is passed through the annular nozzle whereupon the latter, through the extrusion process, coats the passing tube. Prior thereto the tubular surface may have been coated with an adhesive.

Alternatively it is known to provide a synthetic jacket by means of a foil-like ribbon which is helically wrapped around the tube. It is also known to spray powder onto the tube or pipe which powder is then melted to obtain a cohesive layer. In addition to the thermoplastic coating and layering method as outlined above it is also known to coat tubing with an epoxy resin for purposes of corrosion protection with a total thickness of between 0.5 and 0.8 mm.

In order to improve adhesion of the jacketing and coating layer to the steel pipe surface European Patent No. 85 73 0169 proposed to chromatize the surface of steel pipes following spray cleaning (blasting) by means of steel wire grains or granules. Subsequently the tubing so cleaned is completely dried and heated to a temperature of at least 200 C whereupon epoxy resin is applied to form a layer with a thickness of at least 0.05 mm. Prior to curing the epoxy resin an ethylene copolymer is applied to its surface and should be used as a bonding layer and subsequently a polyethylene is applied as an outer cover being bonded to the epoxy resin by means of the ethylene copolymer. These features improve the tube's resistance against corrosion and oxidation while the strength of the layer as such is increased; this is a particularly important feature in those cases where there is a significant moisture at warm temperature. The adhesion between various layers as mentioned is quite adequate from many points of view, but the transition from the chromate layer to the synthetic layer coating is still to be regarded a weak point.

DESCRIPTION OF THE INVENTION

It is an object of the present invention to provide a new and improved method for jacketing steel objects particularly pipes bearing in mind that the adhesion between the chromatized layer and the synthetic layer is to be improved.

It is another object of the present invention to provide a new and improved method for the continuous jacketing of objects such as steel pipes with thermoplastic synthetic whereby specifically the surface of that object is first steel grain blasted following which it is chromatized by means of a three and or six valued Cr compound and under utilization of a binder such as silicate or the like; the Cr compound being in watery solution subsequently the layer is dried possibly at an elevated temperature and prior to applying to the object an epoxy resin curing agent blend to a layer of, say, 0.03 mm thickness or thereabouts; prior to finishing curing of the thus applied epoxy resin at least one adhesive layer is applied made of a copolymer of that thermoplastic material which is being used subsequently in that it is applied in one or several layer with final cooling of the jacketed object down to room temperature at the end of the process.

It is another object of the present invention to provide a new and improved method for the continuous jacketing of objects made of steel particularly steel pipes under utilization of an epoxy resin wherein the surface is of the steel is cleaned by steel grain blasting followed by chromatization, drying at an elevated temperature, applying an epoxy curing agent blend onto the heated object in one or several layers with a total thickness (in the dry state) of at least 0.5 mm following which the tubing is cooled down to room temperature.

In accordance with the preferred embodiment of the present invention it is suggested to apply the epoxy resin-curing agent blend to the cleaned dried surface of the steel object such that the chromatizing agents have been applied prior to a complete conversion of the chromatizing medium and the chromium iron compound, into a thermally stable intermediate layer e.g. a Cr-Fe-Si oxide containing layer; this conversion will take place on account of subsequent heating the object to a temperature which should at first be below the conversion temperature at the time of applying the blend certainly not above 170 degrees C and there should be a safety margin. A range of 105 degrees to 130 degrees C is preferred such that curing can take place and possibly any cover with an adhesive can be applied.

The temperature for the epoxy blend coating is between 100 and 160 degrees C. The coating is preferably carried out immediately after initially heating the object to that temperature. Preferably the blend is applied in two partial layers whereby the first layer uses a type or kind of resin which becomes a highly reactive at temperatures below 170 degrees C as compared with the other resin used in the second partial or sublayer. Subsequently both types of resin are cured as the temperature reaches 170 to 240 degrees C.

Preferably, as far as the two layers are concerned, the first partial layer is applied in the liquidous state and the other one in the powdery state. One should use a polypropylene or polyethylene. The epoxy resin layer should be about 0.05 mm; the bonding layer at least 0.15 mm but not more than 0.3 mm and the thermoplastic cover layer should be applied at a thickness of at least 1.5 mm. The chromatizing is to cover a range from 0.0005 mm to 0.0015 mm following coating the temperature the temperature is dropped to 105–130 degrees C.

Generally speaking the invention is based on the recognition of the following facts. A steel surface may be chromatized prior to applying an epoxy resin which may act also as an adhesive agent for a subsequently applied thermoplastic layer; if an adequate thickness obtains the epoxy may be a synthetic protection layer in its own right. The chromatizing medium is applied as a watery solution and causes the formation of a layer of iron chromates with a dry layer thickness between 0.0005 and 0.0015 mm and causes subsequently a passivization of the steel surface, at least to a considerable extent.

Prior to applying the epoxy resin the steel surface must be completely dry in order to avoid the formation of bubbles underneath the layer. Moreover, the curing of the epoxy resin used for such corrosion protection requires temperature in excess of 170 degrees C. In accordance with state of the art drying was combined with heating of the object to be coated up to that working temperature for the epoxy layer coating. However, heating to such a high temperature without the presence of the resin molecules, has been found to lead to bonding of the chromate to the iron in form of a temperature stable, intermediate layer such that the chromates are exhausted and any subsequently applied epoxy resin will find no longer chromate that is amenable to reaction; exactly that is what has to be avoided.

In the case of using silicate as a bonding agent and as a component of and in the watery solution of a chromatizing medium then such a reaction impeded intermediate layer will actualy contain Cr-Fe-Si oxide. If an epoxy layer is applied to such an inactivated intermediate layer it can bond only to these oxides which is not sufficient. An increase of adhesion of the resin layer is definable as far as the desired bonding between epoxy resin molecules and the primarily formed iron chromate and Si compounds are concerned and which in turn are directly bonded to the iron of the steel object to be coated. That increase is therefore no longer capable of occurring. The prior art simply prevents the formation of chemical bridges between the epoxy resin and the iron molecules, by means of these iron chromates and Si compounds.

As compared with the prior art the invention provides for a stronger bonding of the synthetic layer to the steel surface under operation of chemical adhesive forces owing to the primarily formed iron chromates and Si compounds which constitute and establish the bridging function. For this it is necessary to clean the object to be coated by means of blasting with steel wire grains mentioned above and the cleaned surface is then being wetted with silicate containing chromatizing medium. The silicate is the binder and following the wetting the product is died so that a layer thickness of the chromate layer obtains in the range of 0.0005 to 0.0015 mm. For drying purposes the object is heated to a temperature which is at the most a 160 degree, preferably between 105 degrees and 130 degrees C. or thereabouts was found to be optimal. It is sufficient to remove any and all liquidous residues from the surface with the temperature remaining safely below the danger limit of 170 degrees mentioned above.

It should be realized that the epoxy layer, through the primarily formed chromates is to be caused to firmly adhere to the iron molecules of the object to be coated. This must obtain with certainty as the principal object of the invention. For this then the invention provides for a synthetic coating as soon as possible after the drying of the chromatizing medium and particularly prior to further heating to a temperature above 160 degrees C. This then avoids the formation of a temperature stable intermediate layer that has no longer sufficient reactive ion chromate and silicon compounds bonded to the ion of the object. Subsequent to the coating with the epoxy resin curing agent blend the temperature will be increased to 170–240 degrees C. which is necessary for curing the epoxy resin and, possibly, also for the application of thermoplastic portion within the synthetic layer coating. That temperature increase is delayed as much as possible or at least sufficient to avoid the above mentioned reaction impeding effect.

The application of the epoxy layer may be carried out in a single step but it is preferred to provide that layer in form of two sequentially provided partial or sublayers. The consistency of the sublayers are actually different. As stated earlier the first, inner partial or sub-layer should be relatively highly reactive at the relative lower curing temperature i.e. below 170 degrees C. The corresponding reactivity should be higher for the second partial layer. This way one obtains the requisite "protective spacing" from the formation of a thermally stable intermediate layer which is carried out in dependence on both temperature and time.

It is important that the second partial or sublayer be applied before the first one is cured. This is necessary in order to ensure an intimate bond. The first sublayer is preferably apppplied as a liquidous layer, particularly as the temperature of the object would be too low for melting a powdery epoxy resin agent blend. A layer thickness of 0.0008 to 0.001 mm is sufficient for this first partial or sublayer. The total thickness of the epoxy resin layer should be between 0.05 and 0.07 mm if a temperature cover is applied on top. In the case the epoxy layer is also the insulation cover, the total thickness of the epoxy layer should be between 0.5 and 0.8 mm.

The inventive method is practiced with advantages that the epoxy resin is provided as a precondensate powder with a glass transition temperature below 80 degrees C., preferably between 45 and 65 degrees C. and which cures in a $\frac{1}{4}$ to $\frac{1}{2}$ minute at about 200 degrees C.

For curing the epoxy layer the steel object is inductively heated, or through infrared radiation, to obtain the higher curing temperature of the metal, that is between 180 and 200 degrees C. Prior to completion of curing the epoxy layer one may have to apply a bonding layer made of a copolymer of that particular material which will be used as an outer coating. This is particularly the case when the thermoplastic material such as a polyethylene or polypropelene. Thus, in this case one will use a conveniently available and well known ethylene or propyelene copolymer having adhesive properties. This copolymer bonding layer and an outer jacket made of polypropelene the known procedures may be applied through known methods such as powder application, ribbon wrapping or the like. It is essential that the inventive method is suitable for continuous coating of steel pipes whereby the pipes may be assembled to form an endless string.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
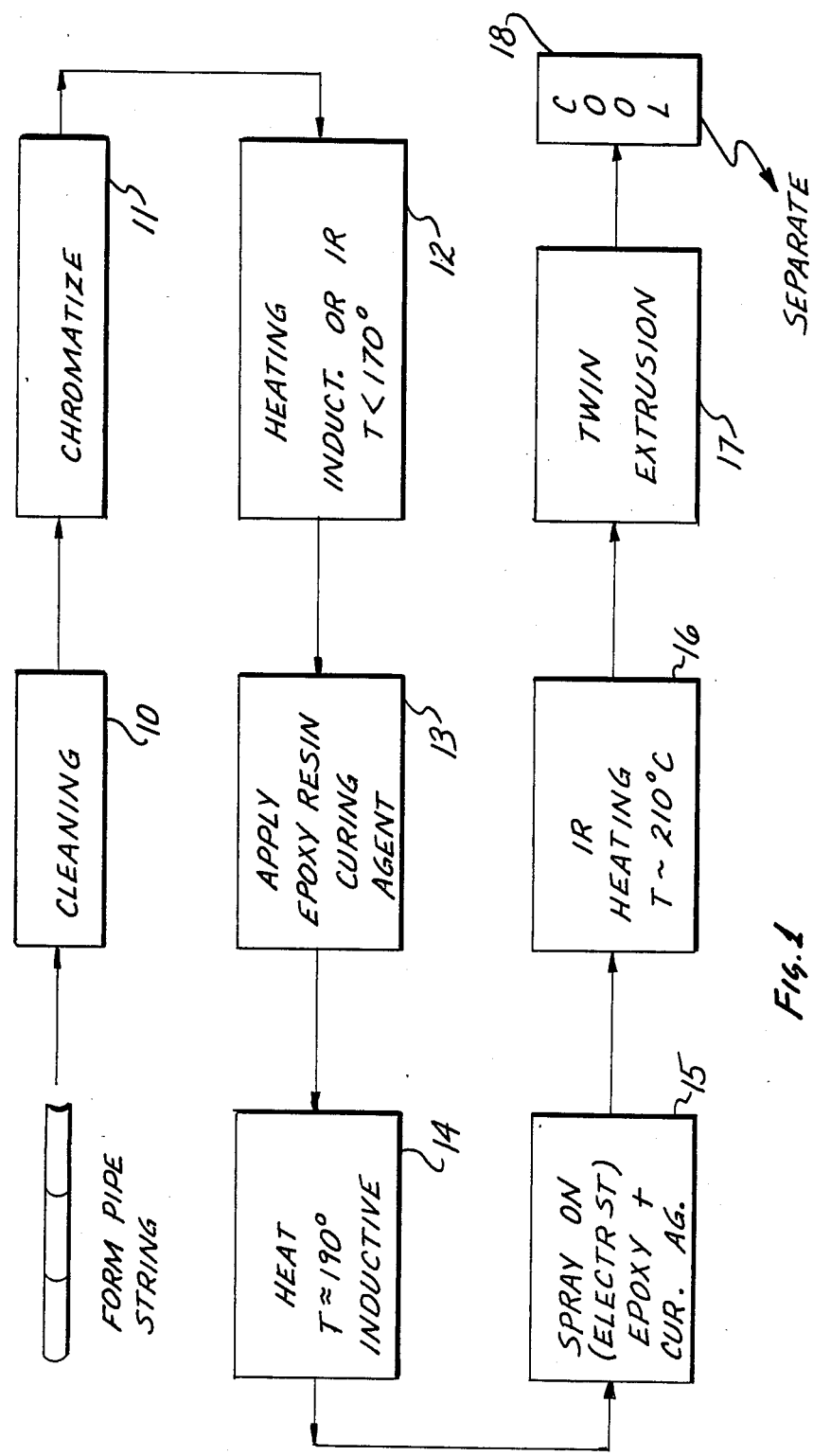
FIG. 1 is a schematic flow chart for practicing the invention.

In the following and in configuration with the FIG. 1, an example is given for practicing the preferred embodiment of the invention with advantage. In a continuously operated synthetic jacketed device for steel pipes, these pipes are pushed together to form a kind of endless string and that string passes a steel jet (wire grains) spraying and cleaning station 10 and from there a chromatizing station 11 for wetting the steel with a 1% watery solution of a 3 and/or 6 valued Cr compound, including silicate as a bonding agent. Wetting is such that in the following drying process in station 12, a dry layer of the chromatizing medium obtains which is about 0.0008 mm thick. Station 12 heats tube for purposes of drying as stated; heating may be carried out inductively to obtain a temperature of about 110 degrees C.

Next a liquidous epoxy resin curing agent blend is applied to the dry tubing. In station 13 this blend is liquidous at the T of 110 degrees C. and now in station 13 a 0.01 mm thick partial or sublayer is applied. The epoxy resin reacts with primary formed iron chromate as well as with the Si compounds bonded to the ion molecules of the steel pipe. In the next station, 14, the tubing is heated to a temperature of about 190 degrees C.; the heating is also an inductive one and here then prior to the curing of the partial layers, another epoxy curing agent blend is applied, in a powdery condensate state and with a glass transition temperature of 60 degrees C. Station 15 may provide for electrostatically spraying on of the powder blend which melts and forms a coherent layer. That layer in turn bonds to the previously applied first partial or sublayer now forming a coherent epoxy layer of at least 0.05 mm thickness dry.

Prior to further jacketing, the tubing passes through an infrared heater 16 to increase the temperature to about 210 degrees C., for accelerating curing of the epoxy. Immediately after the heating, long before completion of curing the tube passes through twin extrusion nozzles 17 wherein a thermoplastic double hose is applied. The twin layer extrusion nozzle 17 provides an inner bonding layer of an ethylene copolymer onto the epoxy layer and at a thickness of about 0.15 mm; in addition an outer layer of about 1.8 mm is applied by the nozzle, not to that bonding layer. This way it is ensured that the thermoplastic jacketing is in fact applied prior to completion of curing of the epoxy and this way one obtains a very intimate bond between adhesive or bonding layer and epoxy resin layer.

In the final stage 18 the tubing passes through a coolant tank filled e.g. with water; the jacketed steel pipe or tube rapidly drops to room temperature. The individual pipes are separated from each other thereafter. The thus coated pipes or tubes when subjected to water of about 65 degrees C. will have a peel strength after 1000 hours of 80 and 100 N/cm; the disbonding value in accordance with ASTM G 8 is from 0 to 1 mm.

The invention is not limited to the embodiments described above but all changes and modifications thereof, not constituting departures from the spirit and scope of the invention, are intended to be included.

We claim:

1. In a method for continuously jacketing steel objects particularly tubing including the steps of cleaning the object by means of blasting its steel surface;

chromatizing the cleaned surface by exposing the surface to a silicate containing watery solution of 3 and/or 6 valued chromium compound or compounds, the improvement comprising:

drying the object at a temperature well below a particular temperature applying an epoxy resin curing agent blend to the dried surface as the temperature remains below the particular temperature;

the particular temperature being the temperature where said solution forms a thermally stable chromium iron silicate oxide intermediate layer on said steel surface;

said blend being applied prior to conversion of the chromatized steel object into said intermediate layer; and heating the steel object after the blend has been applied above the particular temperature to cure the blend.

2. In a method as in claim 1 including the additional step of applying a cover layer prior to completion of curing said blend.

3. In a method as in claim 1 including the step following the application of the chromatizing material of drying by heating between 100 and 160 degrees C. and coating the object immediately and directly thereafter with said epoxy resin curing agent blend.

4. Method as in claim 1 including said epoxy resin curing agent applying step is carried out in two steps to obtain at least two sublayers, the first one of the layers being more reactive than the second one at temperatures below 170 degrees C. and that the two sublayers are cured together thereafter at a temperature between 170 to 240 degrees C.

5. Method as in claim 4 wherein the first sublayer is applied in the liquidous state and the second sublayer is applied as a powder.

6. Method as in claim 2 wherein said cover layer is made of polyethylene.

7. Method as in claim 2 wherein said cover layer is made of polypropelene.

8. Method as in claim 1 wherein following the application of the chromatizing medium the drying temperature is limited to a range between 105 and 130 degrees C.

* * * * *